July 2, 1963  E. C. NEWMAN  3,096,414
ELECTRICAL CIRCUIT CONTROLLERS
Filed Oct. 3, 1958
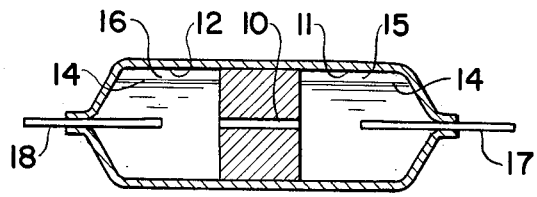
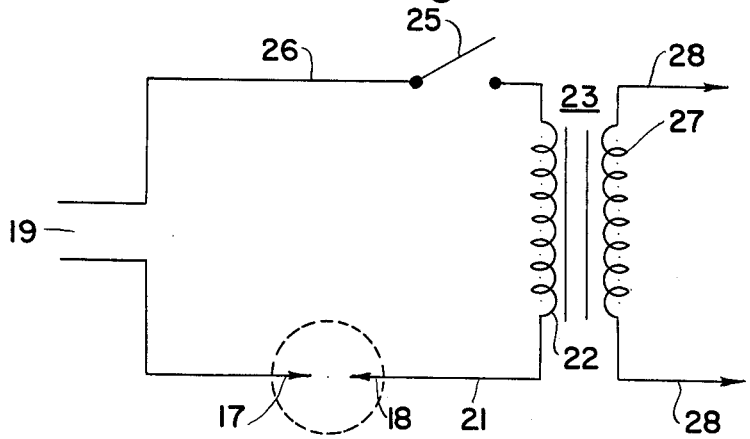
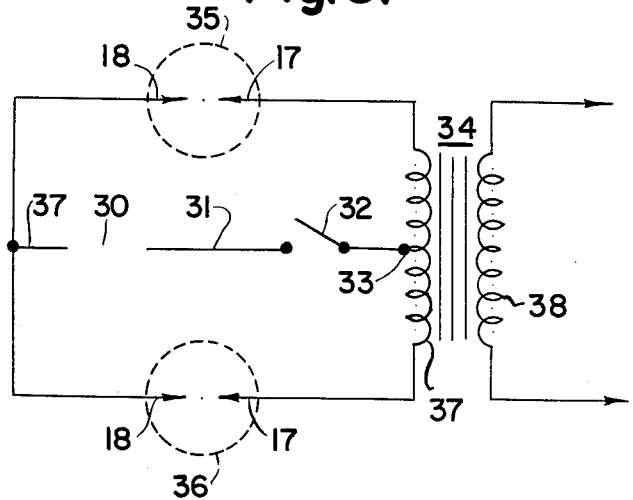
INVENTOR.
E. Clinton Newman United States Patent Office 3,096,414
Patented July 2, 1963

3,096,414
ELECTRICAL CIRCUIT CONTROLLERS
Earl Clinton Newman, Allison Park, Pa.
(8280 Tanglewood Road, Pittsburgh 37, Pa.)
Filed Oct. 3, 1958, Ser. No. 765,140
5 Claims. (Cl. 200—113)

This invention relates to electrical circuit controllers, and particularly, to a control for regulating the flow of current in an electrical circuit and particularly for converting direct current into alternating current and for controlling the frequency of alternation. Various types of mechanical and thermal controllers have been heretofore proposed for regulating and pulsating the flow of electrical current. For example, "vibrators" or electromagnetic pulsators have been used for current pulsation in automotive ignition systems, automotive radios, public address systems. Another form of pulsator heretofore proposed is described in Schimkus Patent No. 2,163,708. In that patent, two spaced reservoirs of mercury are connected by a restricted tube. Each of the reservoirs is provided with a pocket of gas which acts to force the mercury together in the reduced portion. The Schimkus device and many other heretofore devices are very sensitive to external temperature conditions and their application has been limited to those situations where the temperature can be controlled. Other problems such as difficulties in maintenance, expense and manufacture have also characterized the use of such devices.

I have invented an electric circuit controller which is singularly free from temperature sensitivity and which is inexpensive to make and to maintain. I provide an elongated member having a restricted bore, spaced reservoirs opening into said bore, said bore being filled with a conductive fluid capable of volatilizing at elevated temperature, said reservoirs being filled with the same fluid to a point where a small void remains in the reservoir, said reservoir being evacuated at atmospheric gases and being of a size such that the fluid therein will cover the end of the bore in any position of the device and a contact terminal extending through the wall of the reservoir into contact with the fluid in the reservoir at all times. Preferably, the conductive fluid is mercury and the bore is capillary in nature. Preferably, the length and cross section of the bore are regulated to give the desired frequency.

I have described certain objects, purposes and advantages of this invention in the foregoing general description. Other objects, purposes and advantages will be apparent from the following description and the accompanying drawings in which:

FIGURE 1 is a section through a preferred embodiment of my invention;

FIGURE 2 is a wiring diagram of a half wave rectifier circuit in which the device of FIGURE 1 may be advantageously used; and FIGURE 3 is a wiring diagram of a full wave rectifier circuit incorporating the device of FIGURE 1.

Referring to the drawings, I have illustrated a capillary 10 connecting a pair of spaced apart reservoirs 11 and 12 of generally cylindrical configuration. The bore 10 of the capillary and substantially the entire body of reservoirs 11 and 12 are filled with mercury 14 or similar conductive fluid capable of being volatilized by elevated temperatures. A small void area 15 and 16 is provided in each reservoir 11 and 12. This void area is evacuated to a low pressure so that the reservoirs are under vacuum. The two reservoirs 11 and 12 are provided with terminals 17 and 18 sealed into the walls and contacting the mercury therein.

In FIGURE 2, I have illustrated a circuit in which the interrupter of FIGURE 1 may be used. Direct current from an electrical source such as a battery 19 is translated into half wave pulsating components by such a circuit. The terminal 18 is connected through leads 21 to primary winding 22 of a transformer 23, and through a control switch 24 to one side of battery 19. The other side of the battery 19 is connected by switch 25 and lead 26 to the opopsite terminal 18. The ends of the secondary coil 27 of transformer 23 are connected by leads 28 with the input side of a device to be operated 32.

The operation of the wiring system shown in FIGURE 2 is generally as follows. The closing of the switch 25 produces a current flow through primary winding 22 and through the interrupter device of the invention. The current flow will almost instantly volatilize a small part of the mercury in the bore 13 between the contacts 17 and 18. This volatilization of the mercury breaks the circuit and the current flow is cut off. The volatilized mercury condenses to again close the circuit through the bore 13. This breaking of the circuit is effective to energize the secondary winding of the transformer 23, the current flow being in one direction.

In FIGURE 3, I have illustrated a full wave pulsator incorporating the interrupter of FIGURE 1. Direct current from a battery 30 is translated into pulsating components in opposite directions by such circuit. A first terminal of the battery 30 is connected through a lead 31 and switch 32 to a tap 33 on a primary coil 34 intermediate the ends thereof. One side of coil 34 is connected to terminal 17 of an interrupter 35 according to my invention. The other side of coil 34 is connected to terminal 17 of a second interrupter 36 according to my invention. The opposite terminals 18 of each interrupter 35 and 36 is connected to a lead 37 which in turn connects to the second terminal of battery 30.

The apparatus of FIGURE 3 operates in the following manner. The closing of switch 32 produces a current flow through lead 31 into the tap 33 of the primary winding. The current flow will almost instantly volatilize a small part of the mercury in the capillary 10 of one or the other of interrupters 35 and 36 depending upon the position of the tap 33 with respect to the ends of coil 34. This volatilization of the mercury breaks the circuit through this one interrupter and the current is all diverted through the other interrupter. The volatilized mercury in the first interrupter, in the meantime, condenses to again close the circuit. This alternate breaking of the circuit through first one and then the other of alternators is effective to energize one then the other of the two sections of the primary windings 37 of coil 34 formed by tap 33, the current flow being in opposite directions in the two segments. This flow acts on the secondary windings 38 to produce a current alternately in opposite directions and thus produce a full wave alternating current.

The provision of an evacuated void in the controller of my invention is a very necessary part of the invention. It provides an area into which a conductive fluid may expand free of external pressure when volatilization occurs in the bore, and makes this volatilization possible without the extraneous physical and chemical effects of the presence of gas bubbles of materials other than the conducting fluid itself.

While I have illustrated and described a present preferred embodiment and practice of my invention it will be understood that this invention may be otherwise embodied within the scope of the following claims.

I claim:

1. A circuit controller device comprising an elongated restricted bore, spaced reservoirs communicating with said bore, a contact member extending through the wall of each reservoir, a conductive fluid capable of volatilizing at elevated temperature filling said bore and substantially filling said reservoirs to a point where a small void remains in each reservoir, said void forming a minor portion of the volume of said reservoir, said reservoirs being evacuated of substantially all fluids other than the conductive fluid and being of such size that the end of the bore is closed by the conductive fluid in all positions of the bore.

2. A circuit controller device as claimed in claim 1 wherein the conductive fluid is mercury.

3. A circuit controller device comprising an elongated restricted bore, a pair of reservoirs one at each end of the bore communicating with said bore, a contact member extending through the wall of each reservoir, a conductive fluid capable of volatilizing at elevated temperature filling said bore and substantially filling said reservoirs to a point where a small void remains in each reservoir, said void forming a minor portion of the volume of said reservoir, said reservoirs being evacuated and being of such size that the end of the bore is closed by the conductive fluid in all positions of the bore.

4. A circuit controller as claimed in claim 3 wherein the conductive fluid is mercury.

5. A circuit controller as claimed in claim 3 wherein the bore is a capillary bore.

References Cited in the file of this patent
UNITED STATES PATENTS

| | | |
|---|---|---|
| 1,699,769 | Ulrey et al. | Jan. 22, 1929 |
| 1,897,132 | Leins | Feb. 14, 1933 |
| 2,163,708 | Schimkus et al. | June 22, 1939 |
| 2,163,709 | Schimkus | June 27, 1939 |
| 2,306,728 | Heddaeus | Dec. 29, 1942 |
| 2,485,778 | Ryles | Oct. 25, 1948 |